(12) United States Patent
Okazaki et al.

(10) Patent No.: US 10,113,746 B2
(45) Date of Patent: Oct. 30, 2018

(54) ATOMIZER AND COMBUSTION DEVICE USING THE SAME

(71) Applicant: Mitsubishi Hitachi Power Systems, Ltd., Nishi-ku, Yokohama (JP)

(72) Inventors: Hirofumi Okazaki, Yokohama (JP); Akihito Orii, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 323 days.

(21) Appl. No.: 15/015,510

(22) Filed: Feb. 4, 2016

(65) Prior Publication Data

US 2016/0230999 A1    Aug. 11, 2016

(30) Foreign Application Priority Data

Feb. 5, 2015 (JP) ................... 2015-021248

(51) Int. Cl.
*F23R 3/28*    (2006.01)
*F23D 11/10*    (2006.01)
(Continued)

(52) U.S. Cl.
CPC ............... *F23R 3/286* (2013.01); *F02C 3/04* (2013.01); *F23D 11/102* (2013.01); *F23R 3/28* (2013.01);
(Continued)

(58) Field of Classification Search
CPC .... F23R 3/286; F23R 3/30; F23R 3/02; F23D 11/102; F02C 3/02; F05D 2210/11; F05D 2220/32; F05D 2240/24
See application file for complete search history.

(56) References Cited

U.S. PATENT DOCUMENTS 3,556,401 A  *  1/1971  Hughes ................. F23D 11/102
                                                          239/429
3,558,056 A  *  1/1971  Hughes ................. F23D 11/102
                                                          239/427.5
(Continued)

FOREIGN PATENT DOCUMENTS

CN         201129724 Y      10/2008
EP         0 278 115 A1      8/1988
(Continued)

OTHER PUBLICATIONS

Extended European Search Report issued in counterpart European Application No. 16154407.7 dated Jul. 11, 2016 (7 pages).
(Continued)

*Primary Examiner* — Carlos A Rivera
(74) *Attorney, Agent, or Firm* — Crowell & Moring LLP

(57) ABSTRACT

An atomizer includes a mixing chamber for mixing spray fuel and spray medium, a spray fluid flow passage for supplying the spray fluid into the mixing chamber, a spray medium flow passage for supplying the spray medium into the mixing chamber, and an outlet hole for spraying a mixed fluid of the spray fluid and the spray medium which have been mixed in the mixing chamber to the outside. The spray medium flow passage includes a first spray medium supply hole for supplying the spray medium into the mixing chamber, and a second spray medium supply hole for supplying the spray medium into a region more downstream than the first spray medium supply hole in the mixing chamber, and the second spray medium supply hole supplies the spray medium to a region around the outlet hole.

10 Claims, 7 Drawing Sheets

(51) Int. Cl.
*F02C 3/04* (2006.01)
*F23R 3/02* (2006.01)

(52) U.S. Cl.
CPC ...... *F05D 2210/11* (2013.01); *F05D 2220/32* (2013.01); *F05D 2240/24* (2013.01); *F23R 3/02* (2013.01)

(56) References Cited

U.S. PATENT DOCUMENTS

| | | | | |
|---|---|---|---|---|
| 4,890,793 | A | * | 1/1990 | Fuglistaller ........... B05B 7/0458 239/290 |
| 5,165,606 | A | * | 11/1992 | Pelet ....................... F23D 11/40 239/427.3 |
| 5,603,211 | A | | 2/1997 | Graves |
| 6,174,160 | B1 | * | 1/2001 | Lee ....................... F23D 11/007 239/13 |
| 2011/0011092 | A1 | * | 1/2011 | Yoshida ................ F23D 11/104 60/737 |
| 2012/0291439 | A1 | | 11/2012 | Oskam |
| 2013/0319301 | A1 | * | 12/2013 | Okazaki ................... F23D 11/38 110/261 |

FOREIGN PATENT DOCUMENTS

| | | | | |
|---|---|---|---|---|
| EP | 2881662 A1 | * | 6/2015 | ............. B05B 1/044 |
| JP | 62-186112 A | | 8/1987 | |
| JP | 4-254109 A | | 9/1992 | |
| JP | 7-55148 A | | 3/1995 | |
| JP | 9-239299 A | | 9/1997 | |
| JP | 2004-225919 A | | 8/2004 | |
| JP | 2013-174367 A | | 9/2013 | |
| JP | 2013-177988 A | | 9/2013 | |
| JP | 2014-35126 A | | 2/2014 | |
| WO | WO 2014/024842 A1 | | 2/2014 | |

OTHER PUBLICATIONS

Chinese-language Office Action issued in counterpart Chinese Application No. 201610076503.6 dated Sep. 5, 2017 with English translation (Sixteen (16) pages).

Japanese-language Office Action issued in counterpart Japanese Application No. 2015-021248 dated Aug. 21, 2018 with unverified English translation (five pages).

* cited by examiner

ATOMIZER AND COMBUSTION DEVICE USING THE SAME

CLAIM OF PRIORITY

The present application claims priority from Japanese Patent application serial no. 2015-021248, filed on Feb. 5, 2015, the content of which is hereby incorporated by reference into this application.

BACKGROUND OF THE INVENTION

Field of the Invention

The present invention relates to an atomizer and a combustion device provided with the atomizer. Specifically, the present invention relates to the twin-fluid atomizer for atomizing the liquid fuel (spray fluid) with the aid of gas (spray medium for atomization), and the combustion device provided with the atomizer as described above.

Description of the Related Art

The combustion device such as the combustor for gas turbine is demanded to achieve high environmental performance for coping with diverse types of fuel, in other words, fuel diversification, and for reducing unburnt carbon in the exhaust gas and nitrogen oxide (NOx).

Coping with the fuel diversification, the gas turbine of some type employs the dual fuel combustor for selectively using the fuel gas such as natural gas, and the liquid fuel such as light oil and heavy oil A in accordance with the fuel supply situation. The dual fuel combustor is configured to be operable in the case of stagnation of the fuel supply of any one of the gas fuel and the liquid fuel by using the other one.

Aiming at the high environmental performance, the combustor for gas turbine is demanded to reduce emission of the nitrogen oxide (NOx), carbon monoxide (CO), and particulate matters mainly from combustion. As for reduction in the nitrogen oxide (NOx), it is essential to lessen thermal NOx generated by oxidization of nitrogen in the air at high temperatures. The lean fuel premixed combustion method for combusting the fuel which has been preliminarily mixed with excessive air is effective for lessening the thermal NOx. The lean fuel premixed combustion method is designed to supply air more than necessary for complete combustion of the fuel for mixing the fuel and air before combustion. Resultant uniform low-temperature combustion may suppress generation of the thermal NOx.

It is preferable to apply the lean fuel premixed combustion method to the combustor for gas turbine in the use of the liquid fuel for reducing generation of NOx. For the purpose of performing the lean fuel premixed combustion, it is necessary to mix the air with the liquid fuel having the liquid fuel constituent preliminarily vaporized before combustion. If the liquid fuel is atomized in the aforementioned state, the surface area of the liquid fuel per weight is increased to facilitate vaporization. Upon application of the method to the combustion device of another type, atomization of the liquid fuel will increase its surface area per weight to accelerate the combustion reaction, thus reducing CO and unburnt carbon as a result of embers of combustion. Therefore, expedience of atomization of the liquid fuel becomes one of essentials for reducing NOx, CO, and unburnt carbon.

One of the atomizers for atomizing the liquid fuel may be of twin-fluid type, which is configured to supply both the liquid fuel as the spray fluid and the spray medium for atomization such as air and vapor, which are mixed for atomization. Generally, compared with the pressure atomization method for atomizing only the spray fluid, the twin-fluid atomizer exhibits higher atomization performance in the case of spray with large capacity. In spite of change in the supply amount of the liquid fuel, fluctuation in the atomization performance may be lessened by adjusting the supply amount of the spray medium. As a result, the aforementioned type has been generally employed for the combustion device such as the gas turbine combustor with variable combustion load.

The twin-fluid atomizer (hereinafter referred to simply as an "atomizer") is demanded to enhance the atomization performance, and also reduce consumption of energy required for spray by lessening the supply pressure of the spray fluid, and consumption and supply pressure of the spray medium. The atomizer configured to lessen the energy consumption for spray, and to allow highly efficient atomization has been under examination.

Japanese Unexamined Patent Application Publication No. Sho62-186112 exemplifies the atomizer of internal mixing type, configured to mix the spray fluid with the spray medium in the space (mixing chamber) within the flow passage of the atomizer so that the resultant mixed fluid is jetted through a large number of outlet holes. The atomizer is configured to mix the spray fluid and the spray medium in the mixing chamber for atomization. By jetting the mixed fluid at high speeds through the outlet holes, velocity difference between the mixed fluid and the ambient gas will cause the shearing force to act on the spray fluid in the mixed fluid for atomization.

Japanese Unexamined Patent Application Publication No. Hei9-239299 exemplifies the atomizer configured to allow mixtures of the spray fluid and the spray medium to flow from opposite directions so that those mixtures collide with each other around the outlet holes for expediting atomization. The disclosed atomizer is configured to jet the mixed fluid through the outlet holes into a fan-like spray. Because of the fan-like spray shape, the atomizer is called fan-spray type. Compared with the atomizer disclosed in Japanese Unexamined Patent Application Publication No. Sho62-186112, the atomizer of the above-described type is configured to cause collision of the mixed fluids around the outlet holes to accelerate mixture between the spray fluid and the spray medium. The jet of the mixed fluids through the outlet holes is formed into the fan-like shape, resulting in increased boundary surfaces with the ambient gas.

Japanese Unexamined Patent Application Publication No. Hei4-254109 exemplifies the atomizer configured to have a hole through which the spray fluid is jetted to the internal center, and a two-stage orifice formed at the downstream side of the hole. The spray medium is supplied from the upstream side of the two-stage orifice so as to mix the spray fluid and the spray medium by means of the orifice. The atomizer of this type allows high-speed supply of the spray fluid to the orifice so that the spray medium is drawn with the aid of high momentum of the spray fluid. The suction effect derived from the spray medium is capable of lessening the supply pressure of the spray medium. The spray medium is mixed with the spray fluid from the outer periphery so as to pass through the orifice. This makes it possible to narrow the jetting angle of the mixed fluid jetted through the outlet holes.

The atomizer disclosed in Japanese Unexamined Patent Application Publication No. Sho62-186112 is configured to mix the spray fluid and the spray medium for atomization in the mixing chamber so that the mixed fluid is jetted through a plurality of outlet holes. The fluid is atomized mainly through mixture in the mixing chamber and the shearing force generated by difference in the flow velocity between the mixed fluid jetted through the outlet holes at high speeds and the ambient gas. If the flow velocity of the mixed fluid is decelerated in the mixing chamber, the spray fluids which have been atomized by the surface tension thereof will be combined to generate coarse particles. In particular, upon collision of the spray fluid against the wall surface of the mixing chamber, the liquid film is generated on the wall surface, and separated from the spray medium.

In the case of high velocity of the spray fluid around the wall surface, the shearing force will separate the liquid film from the wall surface, which will be mixed with the spray medium again. On the contrary, in the case of low flow velocity of the spray fluid around the wall surface, the liquid film will grow. If the aforementioned liquid film reaches the outlet hole, and is jetted outside the atomizer, it is formed into droplets at the high flow velocity through the outlet hole. Mixture with the spray medium is stagnated, and the droplet has a large particle size. Compared with the mixed fluid flowing at the center of the outlet hole, the spray fluid in the mixed fluid jetted from circumference of the outlet hole may have a larger particle size.

The atomizer disclosed in Japanese Unexamined Patent Application Publication Nos. Sho62-186112 and Hei9-239299 is configured to mix the spray fluid and the spray medium within the atomizer. It is therefore necessary to keep each supply pressure of the spray fluid and the spray medium in the fixed range. The spray fluid in liquid form generally has high density, and exhibits small volume fluctuation upon increase in the supply pressure. Meanwhile, the spray medium in gaseous form generally has low density, and exhibits large volume fluctuation upon increase in the supply pressure. As a result, consumption of energy for increasing the supply pressure of the spray medium is higher than that of the spray fluid. In general, increase in the supply pressure both of the spray fluid and the spray medium results in high atomization performance. However, as the energy consumption is reduced, the supply pressure of the spray medium will be restrictive.

The twin-fluid atomizer disclosed in Japanese Unexamined Patent Application Publication No. Hei4-254109 is configured to mix the spray medium and the spray fluid from the periphery at the upstream side of the orifice. The spray fluid is unlikely to adhere to the partition of the atomizer. It is possible to suppress generation of the coarse particle owing to the liquid film formed on the wall surface. However, the orifice has to be formed in a jetting hole of the spray fluid on the axis of the hole. Because of restriction of the area with which the orifice is formed, the above-structured atomization is not suitable for the high capacity usage.

An object of the present invention is to provide the atomizer that is improved in atomization performance by preventing the liquid film formed around the wall surface of the mixing chamber from reaching the outlet hole of the atomizer, and the combustion device with the atomizer.

Another object of the present invention is to provide the atomizer that is suitable for mixing the spray fluid and the spray medium by facilitating dispersion of the spray fluid in the mixing chamber, and the combustion device with the atomizer.

The aforementioned atomizer is of type with less restrictive arrangement between the supply hole for supplying the spray fluid to the mixing chamber and the outlet hole for jetting the mixed fluid outside the mixing chamber, which is suitable for the high capacity usage.

SUMMARY OF THE INVENTION

In order to address the above problem, the present invention provides an atomizer having a mixing chamber for mixing spray fuel and spray medium, a spray fluid flow passage for supplying the spray fluid into the mixing chamber, a spray medium flow passage for supplying the spray medium into the mixing chamber, and an outlet hole for spraying a mixed fluid of the spray fluid and the spray medium which have been mixed in the mixing chamber to the outside. The spray medium flow passage includes a first spray medium supply hole for supplying the spray medium into the mixing chamber, and a second spray medium supply hole for supplying the spray medium into a region more downstream than the first spray medium supply hole in the mixing chamber. The second spray medium supply hole supplies the spray medium to a region around the outlet hole.

The present invention provides a combustion device which employs an atomizer with a mixing chamber for mixing spray fluid and spray medium, a spray fluid flow passage for supplying the spray fluid into the mixing chamber, a spray medium flow passage for supplying the spray medium into the mixing chamber, and an outlet hole for spraying a mixed fluid of the spray fluid and the spray medium which have been mixed in the mixing chamber to the outside. The spray medium flow passage includes a first spray medium supply hole for supplying the spray medium into the mixing chamber, and a second spray medium supply hole for supplying the spray medium to a region located more downstream than the first spray medium supply hole in the mixing chamber. The second spray medium supply hole serves to supply the spray medium to a region around the outlet hole.

According to the present invention, generation of the liquid film formed on the area around the wall surface of the mixing chamber may be suppressed, thus improving the atomization performance.

The pressure of the spray fluid flowing into the mixing chamber is increased to be higher than the pressure of the spray medium to facilitate dispersion of the spray fluid upon inflow into the mixing chamber, thus expediting the mixture therein.

The present invention provides the atomizer having a plurality of outlet holes so as to be suitable for the high capacity usage, and the combustion device with the above-structured atomizer.

Any other tasks, structures and advantages of the present invention will be clarified by explanations of the embodiments as described below.

DETAILED DESCRIPTION OF THE PREFERRED EMBODIMENTS

Figure 1:
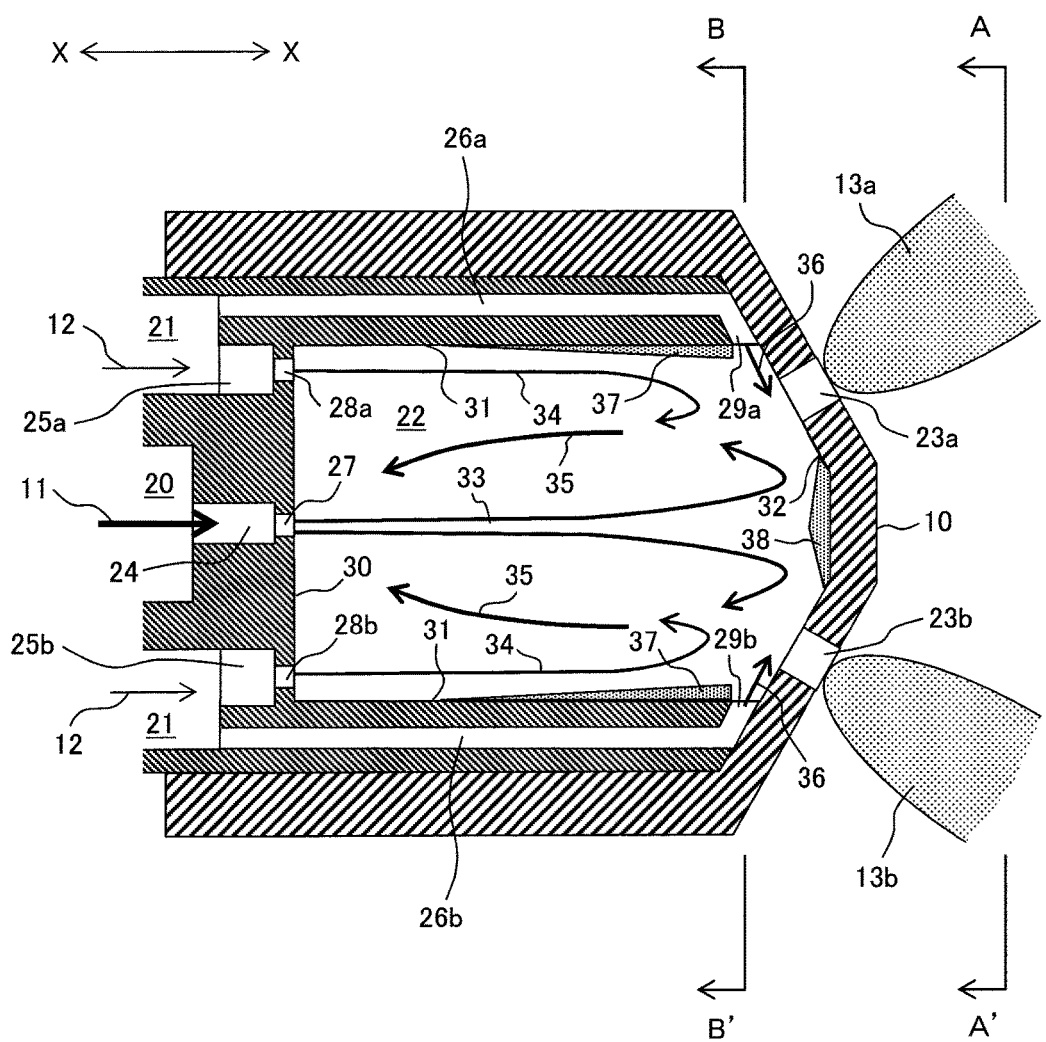
FIG. 1 is a sectional view of a tip of an atomizer according to an embodiment of the present invention.

The atomizer according to an embodiment of the present invention, and a combustion device provided with the atomizer will be described referring to the drawings. The same structures shown in the respective drawings will be designated with the same codes, and explanations thereof, thus will be omitted.

First Embodiment

An atomizer 10 according to a first embodiment of the present invention will be described referring to FIGS. 1 to 4.

Figure 2:
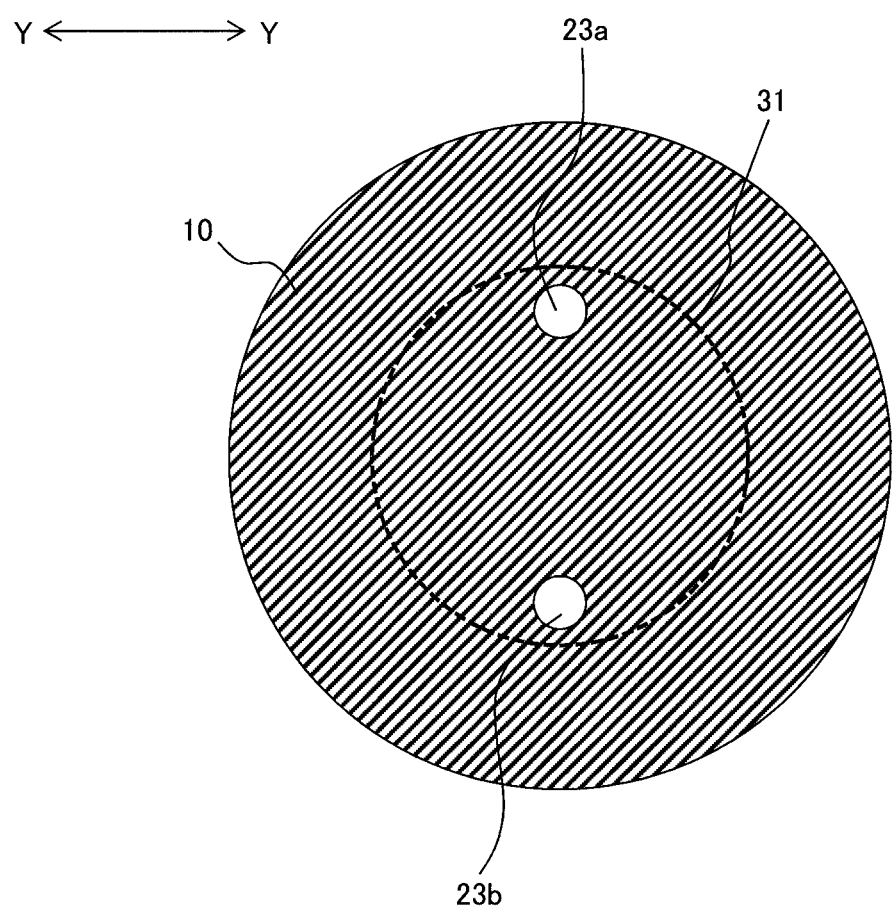
FIG. 2 is a plan view of the atomizer according to the embodiment of the present invention, which is seen from a downstream side of the direction where the spray fluid is supplied.
Figure 3:
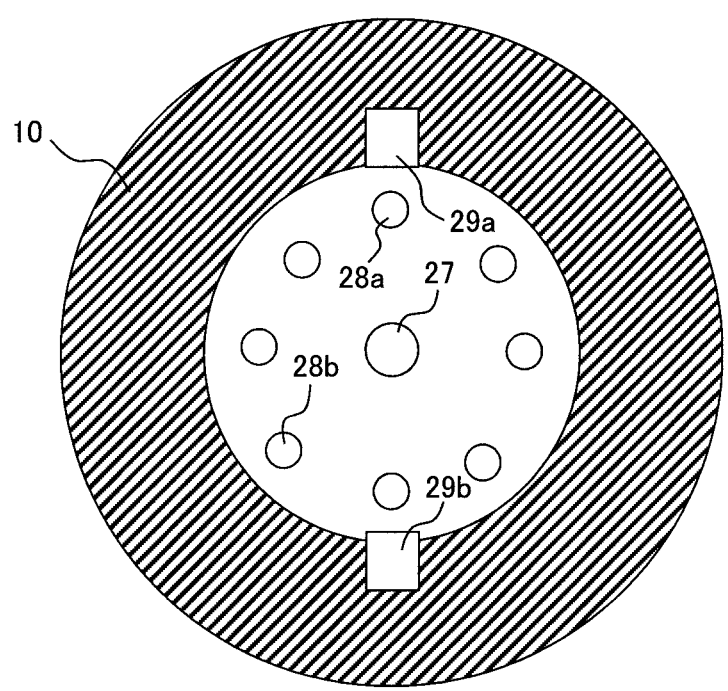
FIG. 3 is a sectional view of the atomizer according to the embodiment of the present invention, which is seen from the tip.
Figure 4:
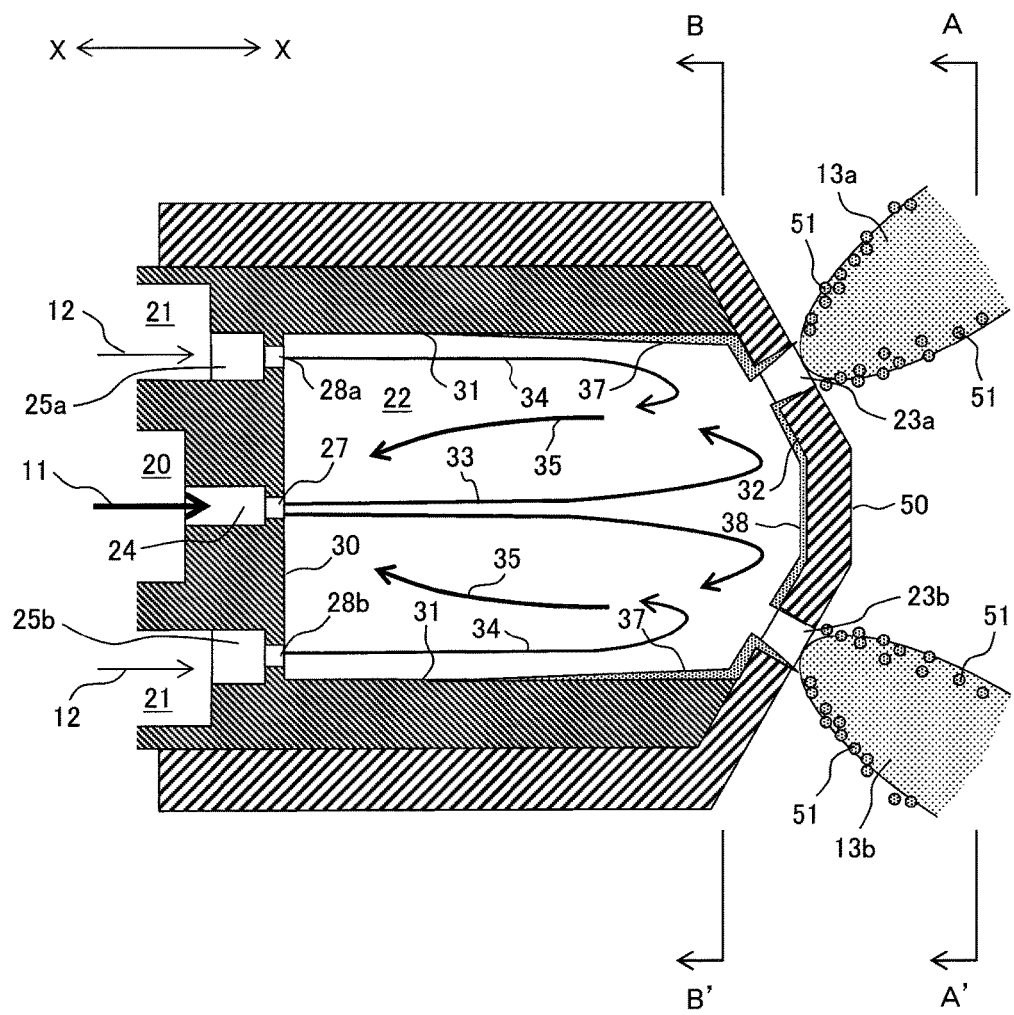
FIG. 4 is a sectional view of a tip of a conventionally employed atomizer.
Figure 5:
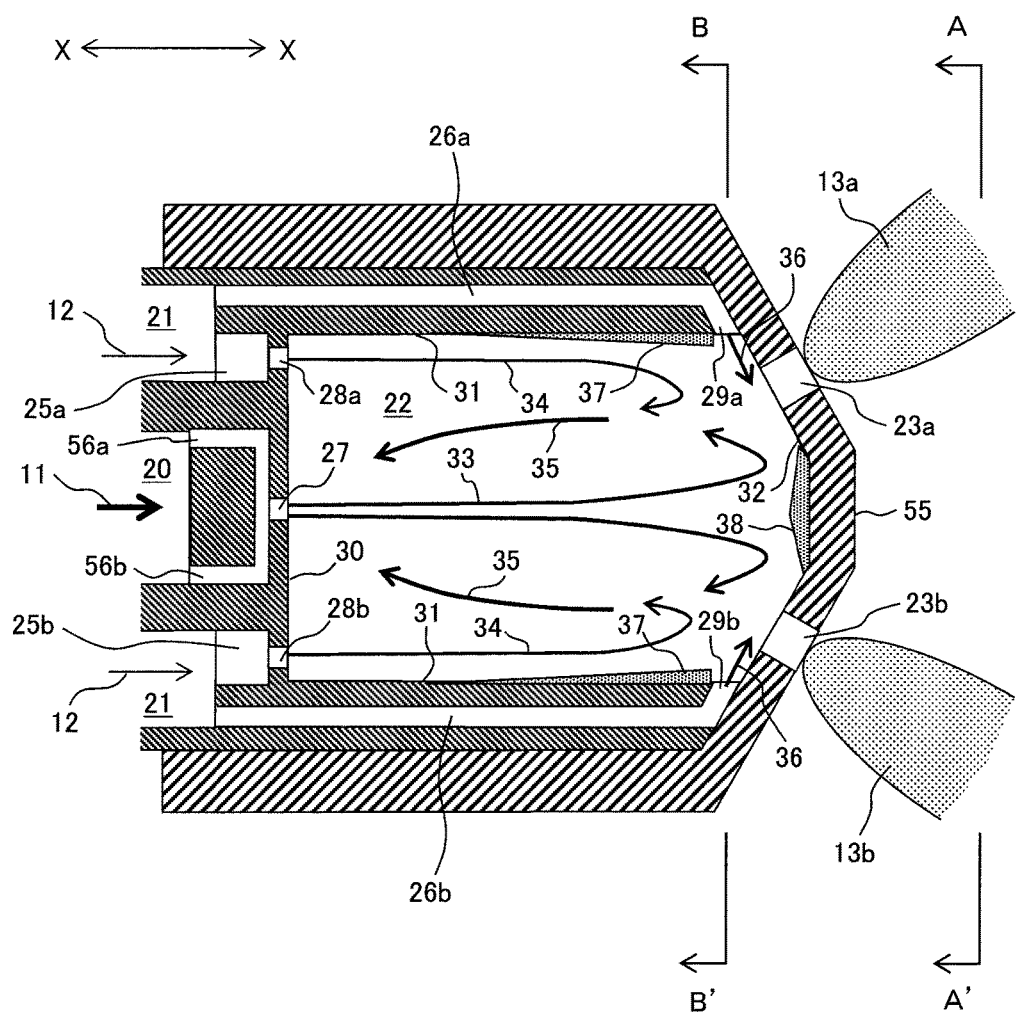
FIG. 5 is a sectional view of a tip of an atomizer according to an embodiment of the present invention.

FIG. 1 is a sectional view of a tip of the atomizer 10 according to the first embodiment of the present invention. FIG. 2 is a plan view of the atomizer 10 of the first embodiment as shown in FIG. 1, which is seen from the downstream side of the direction where the spray fluid is supplied (direction A-A' shown in FIG. 1). FIG. 3 is a sectional view of the atomizer 10 of the first embodiment, taken along line B-B' of FIG. 1. FIG. 4 is a sectional view of the tip of the conventionally employed atomizer 50 in comparison with FIG. 1.

The atomizer 10 according to this embodiment as shown in FIGS. 1 to 3 is one of the twin-fluid atomizers for mixing spray fluid 11 and spray medium 12 for atomization. A spray fluid supply pipe 20 for supplying the liquid fuel as the spray fluid 11 and a spray medium supply pipe 21 for supplying the spray medium 12 in gaseous form are connected, both of which are supplied to the upstream side of the atomizer 10. FIG. 1 is a sectional view illustrating that the spray medium supply pipe 21 is installed while surrounding the spray fluid supply pipe 20 concentrically therewith. A mixing chamber 22 is formed inside the tip of the atomizer 10 so that the spray fluid 11 and the spray medium 12 are mixed in the mixing chamber 22. The tip of the atomizer 10 at a downstream end of the mixing chamber 22 has outlet holes 23a and 23b open to the outside of the atomizer 10. The mixture of the spray fluid 11 and the spray medium 12 forms fuel sprays 13a and 13b from the outlet holes 23a and 23b, respectively. The spray fluid 11 is in the form of liquid fuel such as light oil and heavy oil A, and the spray medium 12 is generally in the form of air or vapor under pressure.

The atomizer 10 according to the first embodiment is featured by structure of the flow passage of the spray medium 12 which flows into the mixing chamber 22. The flow passage structure of the atomizer 10 and the flow therein will be described hereinafter.

The spray liquid 11 is supplied from the spray fluid supply pipe 20 to the mixing chamber 22 via a spray fluid flow passage 24 and a spray fluid supply hole 27. The spray fluid supply hole 27 is formed in an upstream end surface 30 of the mixing chamber 22.

Meanwhile, the spray medium 12 supplied from the spray medium supply pipe 21 is branched to flow through spray medium flow passages 25 (25a, 25b), and 26 (26a, 26b). The spray medium 12 is partially supplied into the mixing chamber 22 from the spray medium supply pipe 21 via the spray medium flow passages 25a, 25b, and first-stage supply holes 28a, 28b which are formed in the upstream end surface 30 of the mixing chamber 22.

Referring to FIG. 1, the spray fluid supply hole 27 is formed in the center of the upstream end surface 30, and the first-stage supply holes 28a and 28b are formed in the area at the outer circumference of the upstream end surface 30 around the boundary with a side surface 31. It is possible to form the spray fluid supply hole 27 and the first stage supply holes 28a, 28b which are adjacent with one another for accelerating mixture. It is further possible to form the first-stage supply hole in the center of the upstream end surface 30, and the spray fluid supply hole in the area at the outer circumference of the upstream end surface 30 around the boundary with the side surface 31. It is still possible to form a plurality of spray fluid supply holes, or a plurality of first stage supply holes, and to arrange those holes into an annular shape.

The spray medium 12 from the spray medium supply pipe 21 is partially supplied into the mixing chamber 22 via the spray medium flow passages 26a, 26b, and second-stage supply holes 29a, 29b. The atomizer 10 shown in FIG. 1 is exemplified by the second-stage supply holes 29a, 29b adjacent to the area for connecting the side surface 31 and the downstream end surface 32 of the mixing chamber 22.

The atomizer 10 according to the embodiment is configured to expedite atomization of the spray fluid 11 mainly by the following effects (a) to (d).

(a) The atomization is performed by the shearing force generated by flow velocity difference between the spray fluid 11 from the spray fluid supply hole 27 into the mixing chamber 22, and the fluid which stagnates in the mixing chamber 22.

(b) The atomization is performed by mixing the spray fluid 11 and the spray medium 12 in the mixing chamber 22.

(c) The atomization is performed by the shearing force at the high flow velocity part of the mixed fluid upon passage through the outlet holes 23a and 23b.

(d) The atomization is performed by the shearing force generated by flow velocity difference between the mixed fluid which has been jetted from the outlet hole, and the ambient gas.

The atomizer 10 is configured to mix the spray fluid and the spray medium in the mixing chamber 22 to improve atomization performance of the atomizer through the effects (a) to (c) at the upstream side in addition to the atomization effect (d) after jetting the mixture from the outlet hole.

Upon supply of the spray fluid 11 into the mixing chamber 22, the reduced cross-section area of the spray fluid supply hole 27 allows high flow velocity of a flow 33 of the spray fluid around the spray fluid supply hole 27. The flow velocity difference between the flow 33 of the spray fluid and the mixed fluid which stagnates in the mixing chamber 22 generates the shearing force acting on the flow 33 of the spray fluid so as to atomize the spray fluid 11. On the other hand, the thus narrowed spray fluid supply hole 27 to jet the fluid at high flow velocity may intensify collision of the spray fluid against the downstream end surface 32 of the mixing chamber 22, resulting in progress of abrasion of the wall surface. It is necessary to increase the supply pressure of the spray fluid 11 for jetting at the high flow velocity. Therefore, the flow velocity of the fluid jetted through the spray fluid supply hole 27 inevitably has an upper limit in practical use.

If each distance between the spray fluid supply hole 27 and the first-stage supply holes 28a, 28b is widened, each flow (circulation flow) 35 directed from the downstream side to the upstream side is generated between the flow 33 of the spray fluid and a flow 34 of the spray medium, respectively. Existence of the circulation flow 35 near the flow 33 of the spray fluid enhances the effect (a) for atomizing the spray fluid 11 by the shearing force as described above. On the contrary, existence of the circulation flow 35 retards mixture of the spray fluid and the spray medium, resulting in lessened atomization effect (b) through mixing.

Conversely, if each distance between the spray fluid supply hole 27 and the first-stage supply holes 28a, 28b is reduced, mixture of the spray fluid and the spray medium is accelerated to enhance the atomization effect (b) through mixing. On the other hand, the flow velocity difference between the flow 33 of the spray fluid and the circumferential flow becomes small, thus lessening the atomization effect (a). As described above, those effects (a) and (b) conflict with each other with respect to the arrangement suitable for atomization.

The atomization effects (c) and (d) may be enhanced by reducing each cross-section area of the flow passage of the outlet holes 23a, 23b so as to extend the length of the contraction flow portion. However, extended length of the contraction flow portion by narrowing the cross-section area of the flow passage of the outlet hole may increase the pressure difference between the mixing chamber 22 and the outside of the atomizer 10. As a result, increase in the supply pressures of the spray fluid 11 and the spray medium 12 is necessary, which may lead to increase in consumption of energy required for spraying.

Focusing on the flow of the spray fluid or the spray medium around the outlet holes 23a, 23b, the atomizer 10 according to this embodiment is configured to provide the method of expediting atomization while suppressing the energy consumption required for spraying.

The atomizer 10 according to the embodiment as shown in FIG. 1 is different from the generally employed atomizer 50 as shown in FIG. 4 in the second-stage supply holes 29a, 29b. The atomizer 10 of the embodiment will be described in comparison with the conventionally employed atomizer 50.

As the spray fluid and the spray medium are mixed in the mixing chamber 22 for atomization, the spray fluid exists in the mixed fluid in the droplet form. The droplets flowing near the side surface 31 of the mixing chamber 22 partially adhere to the side surface 31 where they are combined to form a liquid film 37 of the spray fluid 11. The liquid film 37 develops along the flow directed downstream. The droplets partially adhere to the downstream end surface 32 of the mixing chamber 22 as they flow therearound, which are combined together to form a liquid film 38 of the spray fluid 11.

Referring to the conventionally employed atomizer 50 as shown in FIG. 4, the liquid films 37, 38 at the downstream side reach the outlet holes 23a, 23b. The flow velocity difference between the liquid films 37, 38 flowing along the wall surface of each contraction flow portion of the outlet holes 23a, 23b, and the mixed fluid flowing at the center part generates the shearing force to split the liquid film into droplets 51 flowing on the outer circumference of sprays 13a, 13b. As those droplets 51 are atomized at a point near the outlet hole with a short distance therefrom, mixture with the spray medium is insufficient. The resultant particle size is larger than that of the droplet flowing at the inner circumference of the sprays 13a, 13b, that is, coarse particles.

For the purpose of suppressing generation of the coarse particles, it is necessary to increase consumption of the spray medium to accelerate the spray velocity from the outlet hole. In the aforementioned case, increase in consumption of the spray medium as well as the supply pressures of the spray fluid and the spray medium may demand more power (energy) for spraying.

As FIG. 1 shows, the atomizer 10 according to the embodiment includes the second-stage supply holes 29a, 29b for supplying the spray medium at the area for connecting the side surface 31 and the downstream end surface 32 of the mixing chamber. The spray medium is partially jetted from the second-stage supply holes 29a, 29b to the outlet holes adjacent to the inner circumference to provide advantageous effects A and B as described below.

The advantageous effect A is effective for atomization of the liquid film 37 flowing along the side wall in the mixing chamber. The shearing force generated by the flow velocity difference between the spray medium (flow 36 of the spray medium) jetted from the second-stage supply holes 29a, 29b, and the liquid film flowing along the side wall serves to separate the liquid film from the wall surface into droplets for atomization. As the droplets flow in the mixing chamber at high flow velocity, the atomization may be expedited by the velocity difference from the mixed fluid in the mixing chamber in addition to the flow 36 of the spray medium.

The advantageous effect B is effective for inducing the liquid film 38 adhered to the downstream end surface 32 toward the direction apart from the outlet holes 23a, 23b. As the spray medium is jetted from the second-stage supply holes 29a, 29b toward the axial center direction, it becomes difficult for the liquid film 38 to reach the outlet holes 23a, 23b, and the thickness of the liquid film 38 is reduced around the outlet holes. By locating the liquid film 38 apart from the outlet hole, or reducing the liquid film thickness may lessen generation of the coarse particles resulting from the liquid film jetted through the outlet hole.

The aforementioned advantageous effects allow the atomizer 10 according to the embodiment to prevent the liquid films 37, 38 generated on the partition (wall surface) of the mixing chamber from reaching the outlet holes, thus suppressing generation of the coarse particles 51. As mixture of the spray fluid adhered to the wall surface of the mixing chamber and the spray medium therein is accelerated, the particle size of the spray fluid in the spray formed from the outlet hole may be made small, resulting in high atomization efficiency. It is therefore possible to lessen power (energy) required for spraying by reducing consumption of the spray medium and supply pressures of the spray liquid and the spray medium.

Especially, in the case where the liquid film 37 exists in each area between the second-stage supply holes 29a, 29b and the outlet holes 23a, 23b, the advantageous effect A applies. Meanwhile, in the case where the liquid film 38 exists at a position apart from the outlet hole 23a or 23b, the advantageous effect B applies. The flow rate of the spray medium may be decreased by selectively using the flow of the spray medium from the second-stage supply holes 29a, 29b in accordance with the purpose corresponding to any one of the two advantageous effects.

Because of two advantageous effects A and B, there is no need of forming the outlet holes 23a, 23b do not necessarily have to be formed on the axis (X-X direction of FIG. 1) of an opening of the spray liquid supply hole 27. Therefore, a large number of outlet holes 23a, 23b are formed to extend the length of circumference of the spray 13 (13a, 13b) to expedite atomization by the effect (d) as described above while reducing the number of the spray fluid supply holes 27 to simplify structure of the mixing chamber 22 at the upstream side.

Referring to the embodiment as shown in FIGS. 1 to 3, the second-stage supply hole is only formed around the outlet hole. However, it is possible to form a large number of holes along the side wall of the mixing chamber. It is further possible to form those holes in an annular arrangement.

In the case where the second-stage supply holes are only formed around the outlet holes as shown in FIG. 3, the liquid film located around the outlet holes is only removed. Meanwhile, a large number of the second-stage supply holes along the side wall of the mixing chamber or those in the annular arrangement may expedite atomization of the liquid film flowing along the side wall at the location around the downstream end of the mixing chamber.

Preferably, the mixed fluid externally sprayed through the outlet holes 23 (23a, 23b) of the atomizer 10 is atomized to form the sprays 13 (13a, 13b) each having diameter smaller than 100 μm, and more preferably, equal to or smaller than 50 μm. As the surface area of the particulate is large relative to the volume, thermal radiation from the combustion chamber is likely to raise the temperature for evaporation. Furthermore, the resultant combustion reaction in the droplet form is fast.

Meanwhile, the coarse particle with diameter of 150 μm or larger is unlikely to be evaporated or combusted, causing unburnt carbons in the form of CO and particulate matter. The spray fluid and air cannot be sufficiently mixed to cause emission of NOx. The atomization performance of the atomizer 10 is improved so as to generate more particulates, contributing to acceleration of the combustion reaction. The atomization level can be adjusted in accordance with the supply pressures of the spray fluid 11 and the spray medium 12, and gas-to-liquid ratio (ratio of the spray medium 12 to the spray liquid 11).

As described above, in the case where the liquid fuel is used for the gas turbine combustor, the lean fuel premixed combustion is effective for reducing NOx. The lean fuel premixed combustion is designed to preliminarily mix excessive air with the fuel for combustion, and keep the constant temperature during combustion so as to suppress generation of the thermal NOx at the high-temperature part. Upon use of the liquid fuel, it is necessary to preliminarily vaporize the fuel composition in liquid form before combustion so as to be mixed with air. The atomization performance of the atomizer 10 is improved so as to generate more particulates for atomizing the liquid fuel. This makes it possible to increase the surface area of the liquid fuel per weight, thus promoting vaporization.

In the case where the liquid fuel is atomized for combustion without vaporization, the surface area per weight is increased to accelerate the combustion reaction. Therefore, the unburnt carbon is unlikely to be generated, reducing CO and particulate matter discharged from the combustion device.

If the atomizer 10 of the embodiment is applied to the diffusion combustion type combustor or boiler for combustion by supplying fuel and air separately, the preliminary vaporization of the fuel is increasingly performed through atomization so as to be mixed with air, thus reducing generation of NOx. Increase in the surface area per weight by atomization may accelerate combustion reaction, thus reducing CO and particulate matter.

The improved atomization performance according to the embodiment allows atomization in spite of reduction in the spray medium consumption, and supply pressures of the spray fluid and the spray medium. It is therefore possible to reduce consumption of energy required for supplying the fluid and the medium, and providing applied pressure.

By lessening the unburnt carbon, particulate matter, and carbon monoxide, the excessive air to be introduced into the combustor provided with the atomizer 10 may be reduced. Reduction in the excessive air may decrease emission of combustion exhaust gas to reduce sensible heat which will be released outside the combustion device together with the combustion exhaust gas. This makes it possible to improve thermal efficiency.

Second Embodiment

An atomizer 55 according to a second embodiment of the present invention will be described referring to FIGS. 5 and 6.

FIG. 5 is a sectional view of a tip of the atomizer 55 according to the second embodiment of the present invention. FIG. 6 is a sectional view of the atomizer 55 of the second embodiment, taken along line B-B' of FIG. 5.

The atomizer 55 according to the second embodiment as shown in FIGS. 5 and 6 has basically almost the same structure as that of the atomizer 10 according to the first embodiment as shown in FIGS. 1 to 3. Explanation of the structure common to those embodiments is omitted, and different structure will only be described.

The atomizer 55 according to the second embodiment has spray fluid flow passages 56*a*, 56*b* at upstream side of the spray fluid supply hole 27. In other words, the spray fluid 11 flows from the spray fluid supply pipe 20 while being branched to flow through the spray fluid flow passages 56*a*, 56*b*. At downstream sides of the spray fluid flow passages 56*a*, 56*b*, channels through which the fluid flows in opposite directions are formed. Referring to FIG. 6, the spray fluid supply hole 27 is located at the intersection between a groove 57 and the spray fluid flow passages 56*a*, 56*b*, which are orthogonal to each other.

The spray fluid 11 will flow into the mixing chamber 22 in the form of a fan-like spray expanding along the plane perpendicular to the flow passage direction as a result of collision of the opposing flows around the spray fluid supply hole 27. Meanwhile, the spray medium 12 flows from the spray medium supply pipe 21 while being branched to flow through the spray medium flow passages 25 (25*a*, 25*b*), and 26 (26*a*, 26*b*) likewise the atomizer 10 according to the first embodiment.

The spray medium 12 flows into the mixing chamber 22 from the first-stage supply holes 28*a*, 28*b*, and the second-stage supply holes 29*a*, 29*b*. Referring to FIG. 6, the first-stage supply holes 28*a*, 28*b* are formed to have large cross-section areas of openings in the longitudinal direction of the groove 57.

The method of spraying the spray fluid 11 through collision is called fan spray type because of the spray shape. As the spray fluid 11 diffuses through collision into the fan-like shape, it will flow into the mixing chamber 22 at the lower jet flow velocity than the flow as described in the first embodiment. In the case of fan-like spray, the area of the boundary between the spray fluid 11 formed around the spray and the mixed fluid in the mixing chamber 22 is increased to be more than the area in the first embodiment. Increase in the area where the shearing force acts on the spray fluid 11 allows easy atomization of the spray fluid 11. As the atomization of the spray fluid proceeds in the mixing chamber, the surface area of the spray fluid per unit weight is increased, thus facilitating coexistence with the spray medium. Accordingly, the spray fluid is unlikely to collide against the side wall or the downstream end surface of the mixing chamber, thus suppressing generation of the liquid films 37, 38.

Figure 6:
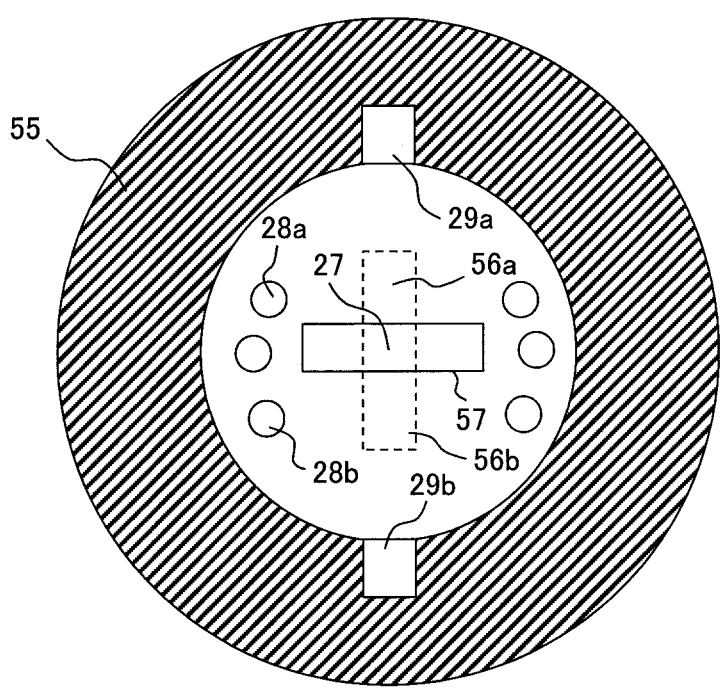
FIG. 6 is a sectional view of the atomizer according to the embodiment of the present invention, which is seen from the tip.

In the case of the fan-like spray, the density of the spray fluid in the longitudinal direction of the spray becomes high, resulting in large particle size. As FIG. 6 shows, each opening of the first-stage supply holes 28a, 28b are arranged in the wider range for the fan-like spray formed along the longitudinal direction of the groove 57. This may accelerate mixture of the spray fluid and the spray medium to suppress adhesion of the spray fluid to the side surface 31 and the downstream end surface 32 of the mixing chamber. In the second embodiment as shown in FIG. 6, it is preferable to locate the jet hole and the outlet hole for the spray medium biasedly to the direction of the groove 57 so as to expedite atomization. It is to be noted, that the aforementioned arrangement is not necessarily required.

The advantageous effect derived from applying the atomizer according to the second embodiment to the combustion device is almost similar to the one derived from the first embodiment. By suppressing generation of the coarse particle, the unburnt carbon is unlikely to be generated so that generation of CO and particulate matter from the combustion device is lessened. Expedience of atomization may prevent the failure such as calking owing to combustion of the spray particles adhered to the partition of the combustion chamber, and deterioration in the liquid fuel in the atomization process.

Improvement of the atomization performance allows atomization while having less consumption of the spray medium 12, and lower supply pressures of the spray fluid 11 and the spray medium 12 for atomization. It is therefore possible to reduce consumption of energy required for supplying the fluid and the medium, and providing applied pressure.

By lessening the unburnt carbon, particulate matter and carbon monoxide, the excessive air to be introduced into the combustion chamber provided with the atomizer 55 may be reduced. Reduction in the excessive air may decrease emission of combustion exhaust gas to reduce sensible heat which will be released outside the combustion device together with the combustion exhaust gas.

This makes it possible to improve heat efficiency.

Third Embodiment

An example of the combustion device with the atomizer according to a third embodiment of the present invention will be described with respect to the gas turbine combustor provided with the atomizer.

Figure 7:
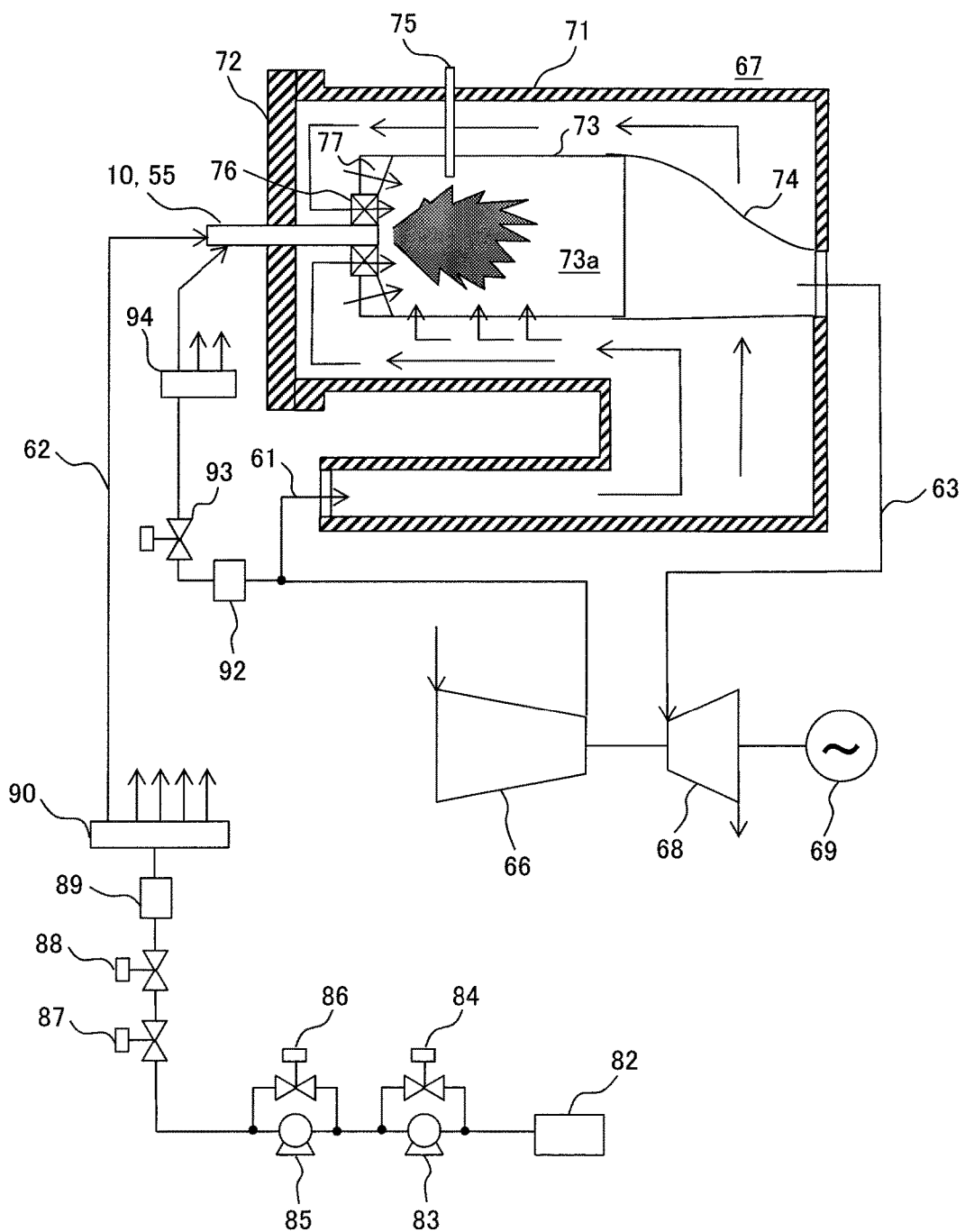
FIG. 7 represents an overall structure of a gas turbine combustor provided with the atomizer according to the embodiment of the present invention, and the gas turbine plant.

FIG. 7 illustrates an overall structure of a gas turbine combustor provided with the atomizer according to the embodiment and the gas turbine plant. The gas turbine plant as shown in FIG. 7 includes a compressor 66 configured to perform air compression to generate high-pressure combustion air 61, a gas turbine combustor 67 constituting the combustion device configured to introduce the combustion air 61 generated by the compressor 66, and liquid fuel 62 for combustion so as to generate high-temperature combustion gas 63, which includes the atomizer 10 or 55 according to the first or the second embodiment, as shown in FIGS. 1 to 6, a turbine 68 driven by introducing the combustion gas 63 generated by the gas turbine combustor 67, and a generator 69 driven by the turbine 68 to generate power.

The motive power for driving the turbine 68 with the aid of the combustion gas 63 generated by the gas turbine combustor 67 serves to rotate the generator 69 for power generation as well as for driving the compressor 66.

The gas turbine plant represents an example for power generation by driving the generator 69 with the aid of the motive power derived from the turbine 68. It is also possible to use the motive power from the turbine 68 for the rotary machine, for example.

The gas turbine combustor 67 having the atomizer 10 or 55 according to the embodiments includes a pressure vessel sealed by an outer casing 71 for introducing the combustion air 61, and an end cover 72 attached to the outer casing 71.

Provided inside the outer casing 71 are an inner casing 73 having a combustion chamber 73a as the combustion space in which the fuel sprayed through the atomizer 10 or 55 is mixed with the combustion air for combustion to generate the combustion gas 63, and a transition piece 74 provided downstream the inner casing 73, which has the flow passage narrower than that of the inner casing 73. The transition piece 74 is connected to the turbine 68 at its downstream side.

The combustion air 61 passes through the space between the outer casing 71 and the inner casing 73, and is supplied into the inner casing 73 from its most upstream side (at the side of the end cover 72 as shown in FIG. 7). The liquid fuel 62 is sprayed from the atomizer 10 or 55 which pierces through the end cover 72 into the combustion chamber 73a within the inner casing 73.

The liquid fuel 62 sprayed into the combustion chamber 73a in the inner casing 73 is mixed with the combustion air 61. The mixed gas is ignited by a spark plug 75 so as to start combustion.

The gas turbine combustor 67 is required to reduce generation of nitrogen oxide (NOx), carbon monoxide (CO), and particulate matter. The mixture process of the combustion air 61 and the liquid fuel 62 is improved, and the jetting direction, flow velocity, flow distribution of the combustion air 61 are adjusted via a swirler 76 for imparting the swirl flow to the combustion air, and an air inlet 77 so as to allow inflow of the combustion air 61 into the combustion chamber 73a within the inner casing 73.

The fuel supply system for supplying the fuel to the gas turbine combustor 67 as shown in FIG. 7 includes a fuel tank 82, a transfer pump 83 for transferring the liquid fuel from the fuel tank 82, and a transfer control valve 84 for adjusting the fuel to be transferred. The system further includes a high-pressure pump 85 for pressurizing the liquid fuel, and a pressure control valve 86 for adjusting the fuel pressure, which are located at the downstream side of the transfer pump 83 and the transfer control valve 84.

The system includes a shut-off valve 87 for blocking the liquid fuel supply, a flow control valve 88 for adjusting the flow rate of the liquid fuel, a fuel flowmeter 89, and a fuel distributor 90 for distributing the liquid fuel at further downstream location. The liquid fuel 62 distributed by the fuel distributor 90 is supplied to the atomizer 10 or 55 of the gas turbine combustor 67.

The combustion air 61 to be supplied to the gas turbine combustor 67 has a part of air compressed by the compressor 66 boosted by a high pressure compressor 92 so that it is supplied to the atomizer 10 or 55 as the spray medium 12 via a pressure-flow control valve 93 and an air distributor 94 which are located at the downstream side of the high pressure compressor 92.

The combustion air 61 may be used for atomizing the liquid fuel 62, and also used as purging air for removing residues in the flow passage and the atomizer 10 or 55 when starting or stopping supply of the liquid fuel 62.

The combustion air 61 may be derived from the method for boosting the compressed air generated by the compressor 66 of the gas turbine, or by the separately provided single compressor. It is also possible to use vapor in place of air.

The gas turbine combustor 67 according to the embodiment as shown in FIG. 7 has been described in the case of using the liquid fuel 62 as the fuel. The aforementioned combustor may be applied to the gas turbine combustor configured to include the gas fuel system separately from the liquid fuel so as to allow use of the gas fuel or the liquid fuel selectively in accordance with the fuel supply situation, which is called dual fuel type gas turbine combustor.

Preferably, the liquid fuel is atomized into particulates each with diameter smaller than 100 μm, and more preferably, 50 μm or smaller. As the surface area of the particulate is large relative to the volume, the thermal radiation from the furnace is likely to increase the temperature as well as to evaporate the fuel. The combustion reaction of the liquid fuel in the droplet form is fast.

Meanwhile, the coarse particle with diameter of 150 μm or larger is unlikely to be evaporated or combusted, which may cause discharge of unburnt carbon, for example, CO and particulate matter. Insufficient mixture of the fuel gas and air may also generate NOx. The atomizer expedites atomization to generate more particulates, thus contributing to acceleration of the combustion reaction. The atomization level can be adjusted in accordance with pressures of the mixed fluid, and quantity of the spray medium (ratio of the spray medium to the spray liquid).

Application of the atomizer 10 or 55 described in the first or the second embodiment to the combustion device described in the embodiment allows expedience of atomization of the spray fluid 11 in the mixed fluid jetted from the respective outlet holes while reducing consumption of the spray medium 12 and applied pressure. As the applied pressure of the spray fluid 11 or the spray medium 12, and consumption of the spray medium 12 decrease, consumption of energy required for the applied pressure and supply may be reduced.

It is also possible to prolong the operating time by suppressing wear of the atomizer 10 or 55, and caulking inside the flow passage.

Atomization of the spray fluid 11 may increase the surface area of the liquid fuel per unit weight to further accelerate the combustion reaction. This may promote oxygen consumption to suppress generation of nitrogen oxide, and reduce the unburnt carbon, particulate matter, and carbon monoxide. In other words, acceleration of the combustion reaction may lessen the carbon monoxide and particulate matter as the unburnt carbons at the outlet of the combustion device, thus improving the combustion efficiency.

The combustion method may be applied to the combustor and the boiler of diffusion combustion type configured to supply fuel and air separately for combustion. The method provides the effect of reducing NOx, CO, and particulate matter resulting from the atomization.

The invention is not limited to the embodiments as described above, and may include various modifications. The embodiments have been described in detail for better understanding of the invention, and are not necessarily restricted to the one provided with all the structures of the description. The structure of any one of the embodiments may be partially replaced with that of the other example. Alternatively, it is possible to add the structure of any one of the embodiments to that of the other embodiment. It is also possible to have the part of the structure of the respective embodiments added to, removed from and replaced with the other structure.

LIST OF REFERENCE SIGNS 10 spray nozzle
11 spray fluid
12 spray medium
13,13a,13b spray
20 spray fluid supply pipe
21 spray medium supply pipe
22 mixing chamber
23,23a,23b outlet hole
2 spray fluid flow passage
25,25a,25b spray medium flow passage
26,26a,26b spray medium flow passage spray fluid supply hole
28a,28b first-stage supply hole
29a,29b second-stage supply hole
30 upstream end surface of mixing chamber
31 side surface of mixing chamber
32 downstream end surface of mixing chamber
33 flow of spray fluid
34 flow of spray medium
35 circulation flow
36 flow of spray medium
37,38 liquid film
50 generally employed atomizer
51 droplet (coarse particle)
55 atomizer
56a,56b spray fluid flow passage
57 groove
61 combustion air
62 liquid fuel
63 combustion gas
66 compressor
67 gas turbine combustor
68 turbine
69 generator
71 outer casing
72 end cover
73 inner casing
73a combustion chamber
74 transition piece
75 spark plug
76 swirler
77 air inlet
82 fuel tank
83 transfer pump
84 transfer control valve
85 high-pressure pump
86 pressure control valve
87 shut-off valve
88 flow control valve
89 fuel flowmeter
90 fuel distributor
92 high pressure compressor
93 pressure-flow control valve
94 air distributor

What is claimed is:
1. An atomizer comprising:
a mixing chamber for mixing spray fluid and spray medium;
a spray fluid flow passage for supplying the spray fluid into the mixing chamber;

a spray medium flow passage for supplying the spray medium into the mixing chamber; and outlet holes formed at a downstream end surface of the mixing chamber for spraying a mixed fluid of the spray fluid and the spray medium which have been mixed in the mixing chamber outside of the mixing chamber, wherein:

the spray medium flow passage includes a first spray medium supply holes for supplying the spray medium into the mixing chamber, and a second spray medium supply holes for supplying the spray medium into a region located more downstream than the first spray medium supply holes in the mixing chamber;

the second spray medium supply holes are formed by a side surface of the mixing chamber and the downstream end surface of the mixing chamber;

the second spray medium supply holes serve to supply the spray medium to a region around the outlet holes adjacent to an inner circumference of the outlet holes.

2. The atomizer according to claim 1, wherein:

the spray fluid flow passage includes at least two channels through which the spray fluid flows in opposite directions at an upstream side of the spray fluid flow passage; and a joint portion of the channels through which the spray fluid flows in opposite directions is formed at a downstream side of the spray fluid flow passage.

3. The atomizer according to claim 1, wherein the spray fluid flow passage includes at least two spray fluid supply holes for supplying the spray fluid from the spray fluid flow passage into the mixing chamber.

4. The atomizer according to claim 1, wherein the spray medium flow passage includes at least two spray medium supply holes for supplying the spray medium from the spray medium flow passage into the mixing chamber.

5. The atomizer according to claim 2, wherein a rectangular groove is formed orthogonal to the channels through which the spray fluids flow in opposite directions so that a spray fluid supply hole for supplying the spray fluid into the mixing chamber is formed at an intersection between the groove and the channels.

6. The atomizer according to claim 5, wherein a channel cross-section area of the spray medium supply holes is widened in a longitudinal direction of the groove constituting the spray fluid supply hole.

7. The atomizer according to claim 1, wherein the first spray medium supply holes are annularly arranged.

8. A combustion device comprising an atomizer with a mixing chamber for mixing spray fluid and spray medium, a spray fluid flow passage for supplying the spray fluid into the mixing chamber, a spray medium flow passage for supplying the spray medium into the mixing chamber, and outlet holes formed at a downstream end surface of the mixing chamber for spraying a mixed fluid of the spray fluid and the spray medium which have been mixed in the mixing chamber outside of the mixing chamber, wherein:

the spray medium flow passage includes a first spray medium supply holes for supplying the spray medium into the mixing chamber, and a second spray medium supply holes for supplying the spray medium into a region located more downstream than the first spray medium supply holes in the mixing chamber;

the second spray medium supply holes are formed by a side surface of the mixing chamber and the downstream end surface of the mixing chamber; and the second spray medium supply holes serve to supply the spray medium to a region around the outlet holes adjacent to an inner circumference of the outlet holes.

9. The combustion device according to claim 8, wherein a liquid fuel is supplied as the spray fluid into the mixing chamber, and air or vapor is supplied as the spray medium into the mixing chamber.

10. The combustion device according to claim 8, further comprising:

a gas turbine combustor serving as the combustion device, which uses a liquid fuel;

a fuel supply system which supplies the liquid fuel to the gas turbine combustor;

a combustion air supply system for supplying combustion air to the gas turbine combustor;

a gas turbine driven by combustion exhaust gas generated by the gas turbine combustor; and a compressor for supplying the combustion air to the gas turbine combustor, wherein the liquid fuel is supplied as the spray fluid into the mixing chamber, and the combustion air is partially compressed as the spray medium so as to be supplied into the mixing chamber.

* * * * *